United States Patent [19]

Yamada

[11] Patent Number: 5,761,387
[45] Date of Patent: Jun. 2, 1998

[54] SYSTEM CONTROLLER

[75] Inventor: Kunio Yamada, Ebina, Japan

[73] Assignee: Fuji Xerox Co., Ltd., Tokyo, Japan

[21] Appl. No.: 523,932

[22] Filed: Sep. 6, 1995

[30] Foreign Application Priority Data

Sep. 12, 1994 [JP] Japan ................... 6-217572

[51] Int. Cl.⁶ ........................................... G06F 15/18
[52] U.S. Cl. ...................... 395/51; 395/77; 364/148
[58] Field of Search ........................... 364/148, 149, 364/150, 151; 395/51, 906, 22, 23, 61, 77

[56] References Cited

U.S. PATENT DOCUMENTS

| | | | |
|---|---|---|---|
| 3,564,221 | 2/1971 | Wheeling | 364/148 |
| 4,616,308 | 10/1986 | Morshedi et al. | 364/159 |
| 4,754,410 | 6/1988 | Leech et al. | 395/51 |
| 4,837,725 | 6/1989 | Yamakawa | 395/3 |
| 4,931,951 | 6/1990 | Murai et al. | 395/51 |
| 4,933,871 | 6/1990 | DeSieno | 395/23 |
| 5,038,269 | 8/1991 | Grimble et al. | 364/148 |
| 5,113,482 | 5/1992 | Lynne | 395/23 |
| 5,159,660 | 10/1992 | Lu et al. | 395/22 |
| 5,265,222 | 11/1993 | Nishiya et al. | 395/51 |
| 5,335,164 | 8/1994 | Gough, Jr. et al. | 364/149 |
| 5,412,757 | 5/1995 | Endo | 395/61 |
| 5,420,964 | 5/1995 | Sugasaka et al. | 395/23 |
| 5,448,681 | 9/1995 | Khan | 395/11 |
| 5,465,320 | 11/1995 | Endutsu et al. | 395/77 |
| 5,481,649 | 1/1996 | Birdwell et al. | 395/77 |
| 5,528,730 | 6/1996 | Yagi et al. | 395/51 |

FOREIGN PATENT DOCUMENTS

A-5-150989  6/1993  Japan.

OTHER PUBLICATIONS

Journal of Japan Fuzzy Association, vol. 4, No. 4 (1992) Dept. of Intelligence Science, Interdisciplinary Graduate School of Science and Engineering, Tokyo Institute of Technology. *"Inference based on examples and aquisition of Knowledge form examples"*, Shigenobu Kobayashi, pp. 646–655.

Artificial Intelligence, 75–4, (1991. 3. .6), Research Issues on Case–Based Reasoning. *"Subject of research of example-based inference"*, Shigenobu Kobayashi, pp. 29–38.

*Primary Examiner*—Robert W. Downs
*Attorney, Agent, or Firm*—Oliff & Berridge, PLC

[57] ABSTRACT

A system controller which significantly reduces the number of development processes and automatically exercises control corresponding to situations. The system controller is made up of a manipulation value output circuit for supplying a manipulation value to a system to be controlled, a control example memory for storing the manipulation value and a controlled variable which is output from the system in response to the manipulation value, a control rule extraction circuit for extracting a control rule from among a plurality of control examples stored in the control example memory, and a manipulation value computing circuit for calculating a manipulation value which matches the controlled variable with a target figure using the control rule extracted by the control rule extraction circuit, and causing the manipulation value output circuit to output the thus obtained manipulation value.

13 Claims, 8 Drawing Sheets

SYSTEM CONTROLLER

BACKGROUND OF THE INVENTION

1. Field of the Invention

The present invention relates to a system controller for controlling an output from a system and, more particularly, to a system controller capable of reducing the number of development processes associated with data sampling, performed at the time of developing commodities to substantially zero, and designing for optimization as well as constantly exercising optimum control with high accuracy at low cost.

2. Description of Conventional Art

Conventionally, artificial intelligence technologies have been widely employed for system control purposes. As representative examples of such technologies, there are an expert system control method based on rules empirically obtained by experts, a model-based inference method on the basis of knowledge of system design, a fuzzy control method, a neural network control method, and the like.

However, the expert system cannot cope with unexperienced situations in which no rules are provided. The model base inference control system can cope with unexperienced situations. However, in depth comprehension (model) of an operating mechanism of an object to be controlled is necessary in order to enable the model-based inference control system to cope with such unexperienced situations. In this way, these conventional control methods have both advantages and disadvantages (Shigenobu Kobayashi "Inference based on examples and Acquisition of knowledge from examples" Journal of Japan Fuzzy Association, Vol. 4, No. 4, pp. 646–pp.655, 1992).

The fuzzy control method and the neural network method have such an advantage that they can deal with a situation in which there is a complicated relationship between inputs and outputs. However, in the case of the fuzzy control method, engineers need to carry out tuning by trial and error, whereas, in the case of the neural network control method, engineers need to previously prepare appropriate teaching data, and a learning cycle must normally be executed many times, that is, between several thousand times and several tens of thousand times. Namely, it takes for a long time.

Hence, these fuzzy and neural network systems cannot usually deal with a system in which the relationship between inputs and outputs is acquired by tuning or studying changes. In other words, to cope with such a system, it is necessary for the fuzzy system to carry out the tuning of a membership function again, whilst it is necessary for the neural network system to prepare teaching data and carry out study again. Thus, these systems required reconstruction of their control systems. For this reason, it is extremely difficult for the fuzzy and neural network systems to implement optimum control of a system to be controlled in real time.

To overcome such a problem, as disclosed in Unexamined Japanese Patent Publication Hei-5-150989 (1993), a case based reasoning (CBR) method in which inference is based on past examples is put forward as an inference method which neither solely depends on rules empirically obtained by experts nor requires in depth comprehension of an operating mechanism of an object to be controlled. In this CBR method, an example most analogous to the current situation is retrieved from among past examples, and inference with respect to the current situation can be executed based on the retrieved example.

However, conventional CBR was chiefly intended to find applications in the field of strategic support, and there are only a few examples in which CBR is used for system control. Since it is used mainly in such applications, CBR usually needs the previous storage of a large quantity of comprehensive data as examples, which requires a large number of development processes.

Further, each of the principal technologies of CBR, i.e., the storage of examples, the retrieval of examples, inference based on examples, and additional study of new examples, is still in the research stage, and it is necessary to make improvements to these technologies to put CBR into practice (Sigenobu Kobayashi "Subject of Research of Example-based Inference", Artificial Intelligence, 75-4 (1991. 3. 6), pp. 29–pp.38).

Specifically, the current state of the art in conventional CBR is that there is no unequivocally quantitative standard for the judgement of similarity during the retrieval of similar examples.

Furthermore, conventional CBR has no established inference method to cope with the case where past examples are not sufficiently analogous to the current situation. For this reason, there is no alternative but to exercise unreliable inference based on insufficient examples.

Differing from the conventional fuzzy and neural network systems, the conventional CBR has a significant advantage in that it is possible to cause the knowledge to grow through the study of new examples as required. However, there is no definite criteria as to whether or not to study, and the reconstruction of new clusters requires manual involvement. Thus, the studying of new examples requires laborious work. In addition, it is difficult to distinguish outdated examples from new examples even if variations arise between the outdated examples and the new examples with a lapse of time, namely, even if the examples become outdated and no longer useful. Thus, there are a lot of problems in applying CER to system control.

SUMMARY OF THE INVENTION

The present invention is conceived to overcome the foregoing drawbacks in the prior art, that is, drawbacks of each of rule-based inference typified by an expert system, example-based inference, model-based inference, and control methods utilizing fuzzy and neural network technologies. The object of the present invention is to exercise control suitable for a situation with a significantly reduced number of development processes.

The present invention also has the following objects:

(1) To make it possible for a controller to improve its controllability by automatically and selectively studying necessary information by itself, in such a way that control errors fall within tolerance.

(2) To make it possible to exercise control using a control rule best suited for the condition of a system, in order to improve control accuracy.

(3) To create a more suitable control rule by combining a plurality of control rules together if a plurality of rules are obtained under a situation analogous to the current situation.

(4) To easily take an univocally quantitative control rule.

(5) To univocally and quantitatively determine a conformity between the present state of a system and past examples.

(6) To make it possible to store updated examples having a higher importance by accurately selecting examples having a least importance and deleting the thus selected examples if a storage capacity necessary for additionally storing new control examples becomes insufficient as a result of the repeated execution of additional storage (studying) of control examples as required.

(7) To suppress a storage capacity for originally storing control examples to a smaller level by sufficiently utilizing information obtained from the control examples.

A system controller of the present invention comprises: manipulation value output means for supplying a manipulation value to a system to be controlled; control example storage means for storing the manipulation value and a controlled variable which is output from the system in response to the manipulation value; control rule extracting means for extracting a control rule from among a plurality of control examples stored in the control example storage means; and manipulation value computation means for calculating a manipulation value which matches the controlled variable with a target figure using the control rule extracted by the control rule extracting means, and causing the manipulation value output means to output the thus obtained manipulation value.

According to the above-mentioned system controller, a combination of a manipulation value and a controlled variable is stored as a control example in the control example storage means. The control rule extracting means derives a control rule from stored control examples, and the manipulation value computation means calculates a manipulation value, which will be used for subsequent control, using the thus derived control rule. In other words, the control of the system to be controlled is executed on the basis of the control rule automatically extracted from the past control examples.

Further, a system controller of the present invention comprises: manipulation value output means for supplying a manipulation value to a system to be controlled; control example storage means for storing, as a set, the manipulation value, a controlled variable which is output from the system in response to the manipulation value, and the quantity of state which exerts an influence upon the controlled variable from the system; control rule extracting means for extracting a control rule from among a plurality of control examples stored in the control example storage means; and manipulation value computation means for calculating a manipulation value which matches the controlled variable with a target figure using the control rule extracted by the control rule extracting means, and causing the manipulation value output means to output the thus obtained manipulation value.

According to the above-mentioned system controller, a control example is formed by the combination of a controlled variable, a manipulation value, and the quantity of state. Hence, this control example is applicable to the situation in which the quantity of state changes.

Furthermore, a system controller of the invention comprises: manipulation value output means for supplying a manipulation value to a system to be controlled; control example storage means for storing, as a set, the manipulation value, a controlled variable which is output from the system in response to the manipulation value, and the quantity of state which exerts an influence upon the controlled variable from the system, and creating a cluster by collecting control examples having similar quantities of state among the control examples stored in the control example storage means; control rule extracting means for extracting a control rule for each cluster; and manipulation value computation means for calculating a manipulation value which matches the controlled variable with a target figure using a control rule of a cluster, having a quantity of state analogous to a quantity of state obtained when control is exercised, from among the control rules extracted by the control rule extracting means, and causing the manipulation value output means to output the thus obtained manipulation value.

According to the above-mentioned system controller, the control examples having similar quantities of state are collected into a cluster within the control example memory means, and the control rule extracting means extracts a control rule for each cluster. Moreover, the manipulation value computation means selects a control rule of a cluster which corresponds to the quantity of state when control is exercised, and therefore a manipulation value, corresponding to the situation at which control is exercised, is output.

Furthermore, a system controller of the invention comprises: manipulation value output means for supplying a manipulation value to a system to be controlled; control example storage means for storing, as a set, the manipulation value, a controlled variable which is output from the system in response to the manipulation value, and the quantity of state which exerts an influence upon the controlled variable from the system, and creating a cluster by collecting control examples having similar quantities of state among the control examples stored in the control example storage means; control rule extracting means for extracting a control rule for each cluster; and manipulation value computation means for obtaining a conformity for a control rule extracted by the control rule extracting means, averaging each of the control rules by carrying out weighing corresponding to the conformity, obtaining a manipulation value which matches the controlled variable with a target figure using a synthetic rule obtained as a result of averaging, and causing the manipulation value output means to output the thus obtained manipulation value.

According to the above-mentioned control system, the manipulation value computation means calculates a conformity of each control rule, and synthesizes each control rule by carrying out weighing corresponding to this conformity. Hence, it is possible to quantitatively judge the conformity between the situation in which control is exercised and each control rule, thereby resulting in highly accurate control. As a result of this, even if the system controller has not previously experienced a situation analogous to the situation in which control is being exercised in the past, it becomes possible to infer a control rule corresponding to a situation the system controller experiencing for first time. Specifically, for example, it becomes possible to create a new rule which can be expected to be adaptable to middle temperatures from control rules for high and low temperatures experienced in the past.

Furthermore, if a controlled variable (a system output) exceeds a preset tolerance, the contents of the control associated with the controlled variable are additionally stored as a control example to be newly stored. A control rule is automatically extracted from a group of control examples including the additionally stored control examples for subsequent control or control subsequent to the next control. Therefore, it becomes possible to exercise control as situations change, and allowable errors automatically fall within an accuracy corresponding to the preset tolerance.

Furthermore, the control rule is extracted for each controlled variable as an n-dimensional plane obtained by processing each control example coordinate using the least square method, within an n+1 dimensional space made of the control variable and a number (n) of manipulation values associated with the control variable. Hence, errors are reduced by statistical processing. Further, control rules are obtained in a purely mathematical manner (as an n-dimensional plane obtained by the least square method), and therefore it becomes unnecessary to physically model the system to be controlled. In other words, it becomes possible to handle the system to be controlled as a black box. Therefore, a physical quantity associated with a control variable is not necessarily included as an element for a control example, and hence a sensor for detecting a physical quantity becomes unnecessary; namely, a preset value of a manipulation value, which is more direct quantity in view of control, can be used in place of the physical quantity.

Moreover, a system controller of the invention comprises: manipulation value output means for supplying a manipulation value to a system to be controlled; control example storage means for storing, as a set, the manipulation value, a controlled variable which is output from the system in response to the manipulation value, and the quantity of state which exerts an influence upon the controlled variable from the system, and creating a cluster by collecting control examples having similar quantities of state; control rule extracting means for extracting a control rule for each cluster as an n-dimensional plane obtained by processing each control example coordinate using the least square method, within an n+1 dimensional space made of the controlled variable and a number (n) of manipulation values associated with the controlled variable; and manipulation value computation means for obtaining a conformity for a control rule extracted by the control rule extracting means, averaging each of the control rules by carrying out weighing corresponding to the conformity, obtaining a manipulation value which matches the controlled variable with a target figure using a synthetic rule obtained as a result of averaging, and causing the manipulation value output means to output the thus obtained manipulation value. The manipulation value computation means obtain the conformity by standardizing, within a coordinate space in which each of control rules is described, a reciprocal of distance between an n-dimensional plane representing a control rule and a coordinate representing a control example immediately before the previous control example with respect to each control rule.

According to the above-mentioned system controller, the automatic extraction of a control rule is carried out for each cluster made of control examples under similar conditions, and a conformity is judged for each cluster when control is exercised. Control rules of each cluster are averaged by weighing corresponding to the conformity. A manipulation value is calculated by the thus obtained control rule. In this case, the control rule is extracted for each controlled variable as an n-dimensional plane obtained by processing each control example coordinate using the least square method, within an n+1 dimensional space made of each controlled variable and a number (n) of manipulation values associated with the controlled variable. A conformity, between the situation when control is exercised and each cluster, is obtained by standardizing, for all similar clusters, a reciprocal of a difference between a point (a controlled variable) of each cluster, corresponding to the same manipulation value as needed the last time control was exercised, in an n-dimensional plane and a control variable (a result of control) obtained the last time control was exercised.

As mentioned above, the system controller according to the present invention can carry out real-time study to maintain a necessary accuracy and automatically extract an optimum control rule even if examples vary with time. The utilization of this automatic extraction of an optimum control rule makes optimizing operations, conventionally performed when a system controller is developed, unnecessary.

DESCRIPTION OF THE PREFERRED EMBODIMENTS

First Embodiment:

(Configuration of System Controller of First Embodiment)

With reference to the accompanying drawings, a system controller according to a first embodiment will now be described. This embodiment is a general-purpose control system capable of controlling various types of objects.

Figure 1:
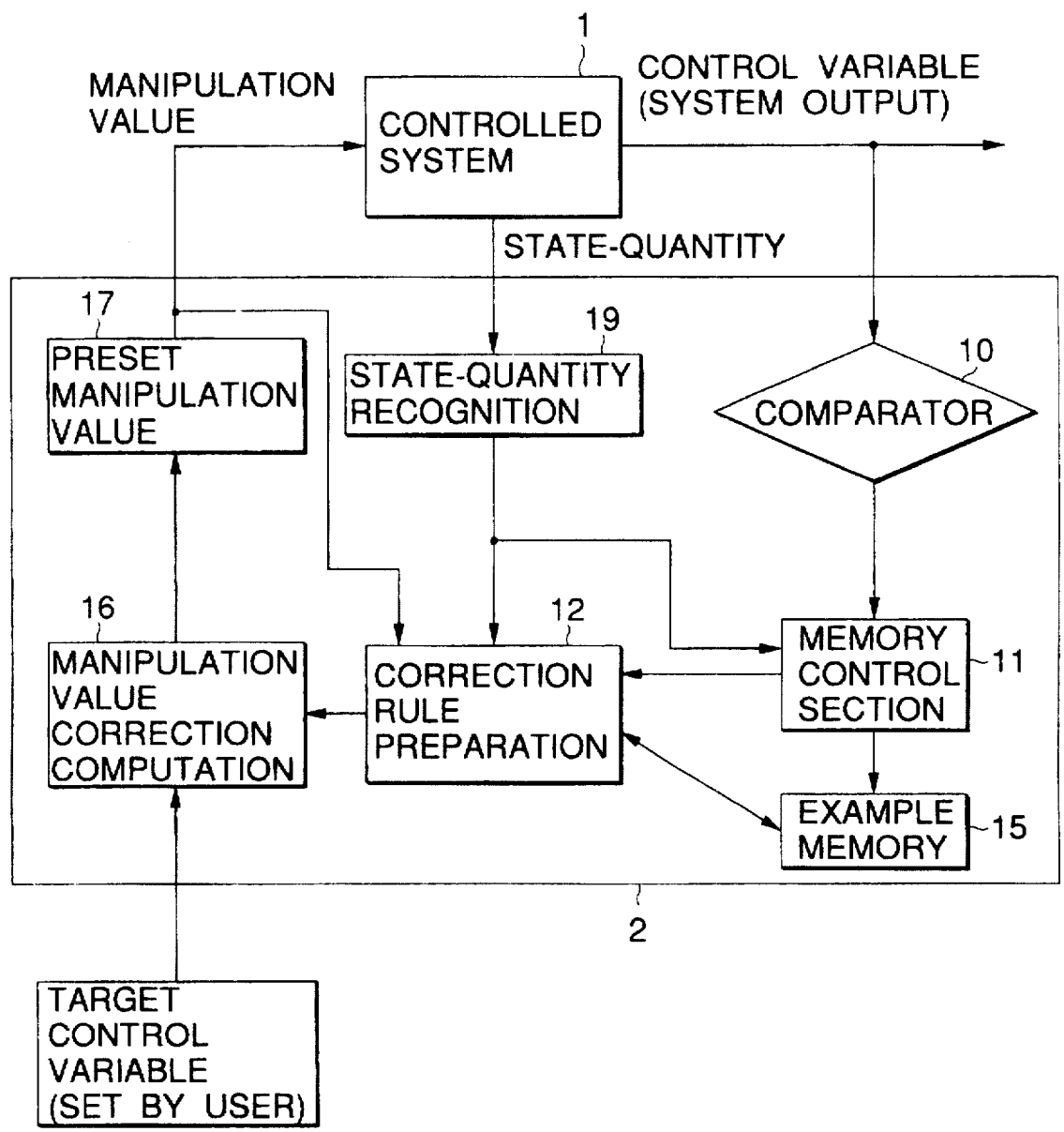
FIG. 1 is a block diagram showing the overall configuration of a system controller according to a first embodiment of the present invention.

In FIG. 1, reference numeral 1 denotes a system to be controlled. The system 1 is provided with an actuator which changes the system according to a supplied manipulation value. The system 1 detects the state of an object to be controlled and outputs the thus detected state as a controlled variable. For example, where the object to be controlled is a laser printer, the manipulation value includes an indicated value of a charged voltage of a photosensitive body or an indicated value of a laser power. Where the object to be controlled is a print density, a detected value of the print density becomes a controlled variable. Here, if the system 1 to be controlled outputs the object to be controlled as a system output, the system output becomes a controlled variable.

Generally, various preset values of factors which can be set to adjust an output of the system to be controlled, such as preset voltages, preset pressures, angles of rotation of control volumes, etc. are adopted as manipulation value. An output of the system to be controlled or a quantity as a substitute for the system output is used as the controlled variable. The output value may be a physical quantity or a psychophysical quantity (such as a good score or a bad score) so long as it is quantified.

In this embodiment, for simplification of explanation, the manipulation value is a preset voltage, and the output value is a dimensionless number. The system 1 to be controlled is designed to output a quantity of state reflecting the conditions where the system is currently situated. In this case, every factor which exerts an influence upon the output of the system 1 can be mentioned as a quantity of state. In other words, the quantity of state may be any quantity so long as it reflects the conditions under which the system 1 is currently situated, such as temperature, humidity, atmospheric pressure, variations occurring with lapse of time, and largeness or smallness of loads. The quantity of state may be quantities of state of a plurality of types.

The quantity of state is not necessarily a direct physical quantity but may be any quantity which can be a substitute for the physical quantity. For example, mechanical abrasion occurs in proportion to an uptime, and the quantity of mechanical abrasion is an important physical factor which exerts an influence on an output of the system 1 to be controlled. In such a case, a cumulative uptime can be used as a substitute for the quantity of abrasion. In short, in view of a system output, any quantity may be usable so long as it makes it possible to grasp the circumstances under which a control example is situated.

Accordingly, an example sampled time is used as a substitute for the quantity of state in this embodiment. This is because the original quantity of state of the system 1 in this embodiment is based on the assumption that a quantity may be as diverse as various environmental conditions, or variations occurring with a lapse of time, but is deemed to be substantially constant within a certain limited range of time. For example, a quantity which is deemed to be different from morning to evening but substantially the same before and after ten minutes may be an object of the quantity of state.

A system controller 2 will now be described. A comparator 10 judges whether or not a controlled variable is within a tolerance. If the controlled variable is within the tolerance, a signal Y is output to a memory control section 11. Contrary to this, if the controlled variable is outside of the tolerance, a signal N is output to the memory control section 11. If the output signal from the comparator 10 is N, the memory control section 11 combines a controlled variable, a quantity of state, and a manipulation value, all of which are obtained at that time, into one set. The set of these elements is stored as a new example into an example memory 15. On the other hand, if the output signal from the comparator 10 is Y, a controlled variable obtained at that time is discarded.

A corrected rule preparation section 12 prepares a corrected rule from examples stored in the example memory 15, and supplies the corrected rule to a manipulation value correction computation section 16. The manipulation value correction computation section 16 calculates a manipulation value, used for achieving a target control variable set by a user, with reference to the corrected rule in the corrected rule preparation section 12. The thus calculated manipulation value is output to the system 1 via a preset manipulation value output section 17.

The system 1 to be controlled outputs time information as a quantity of state, and the thus output time information is supplied to the corrected rule preparation section 12 and the memory control section 11 via a state-quantity recognition section 19. In the case of this embodiment, as will be described later, the time information is used as the time of which an example is acquired. The system controller 2 may be arranged in such a way that time information is generated inside the system controller 2 and the thus generated time information is used if an example acquisition time is employed as the quantity of state.

(Operation of System Controller of First Embodiment)

(1) Initial Setting Operation (Start-up Operation)

The operation of the system controller having the foregoing configuration will now be described. To operate the system controller, an engineer carries out the following start-up operations.

To begin with, the engineer manually sets an arbitrary manipulation value, and the system 1 to be controlled is actuated using this setting. The manipulation value, a controlled variable, and a quantity of state (i.e., sampling time) obtained at that time are stored in the example memory 15 of the system controller 2.

While arbitrarily changing the manipulation value within an allowable range, the engineer repeats the above described operations more than n+1 times, and stores more than n+1 control examples in the example memory 15 of the system controller 2.

Where the symbol "n" is the number of types of manipulation values. For this reason, in the case of the present embodiment in which only a preset voltage is used as a manipulation value, n=1. An example in which the preset voltage is set to a different value is sampled more than twice. If a preset voltage and a preset pressure are used as a manipulation value, n=2. The engineer sets the preset voltage and the preset pressure to different values, respectively, and repeats the above operations more than three times.

Table 1 shows the case where three examples are sampled when only the preset voltage is used as a manipulation value. In this case, time information is represented as the quantity of state. For example, "40525093015" represents 1994, May 25, Nine o'clock, Thirty minutes, Fifteen seconds, in order from the left.

TABLE 1

|  | Quantity of State Year, Month, Day, Hour, Minute, Second | Manipulation Value Set voltage (V) | Controlled Variable Output score |
| --- | --- | --- | --- |
| Example 1 | 40525093105 | 50 | 94 |
| Example 2 | 40525093108 | 60 | 99 |
| Example 3 | 40525093158 | 70 | 103 |

(2) Operation of System Controller in Operation

The operation of the system controller after the start-up operations have been completed will be described. A switch in the system is turned on. When a target controlled variable output is indicated, the system controller 2 calls the most recent control example, i.e., a control example immediately before the switch was turned off the last time, and retrieves all examples having similar quantities of state based on the called control example. In this case, since the system has only just booted up, a control example having the similar quantity of state corresponds to the example 3 in the table 1 which is the last control example after the system has booted up. For this reason, the corrected rule preparation 12 reads the example 3 from the example memory 15.

Moreover, in this embodiment, an example sampled within a sampling time of ±10 minutes is deemed to be a control example sampled under similar circumstances. As a result of this, examples 1 and 2 in table 1 are judged as being analogous to the example 3.

The corrected rule preparation section 12 plots a similar control example in an n+1 dimensional space made of manipulation values and controlled variables. In other words, the manipulation value is only a preset voltage (n=1) in this embodiment, so manipulation values and controlled variables of each control example are plotted on a two-dimensional plane.

However, when there are a number (m) of types of controlled variable, a control example may be plotted in a number (m) of n+1 dimensional spaces. However, if the controlled variable can be represented by the same coordinate axes, the variables may be plotted in the same space. The relationship between a controlled variable and a manipulation value within an n+1 dimensional space is derived as a number (m) of control rules.

Figure 2:
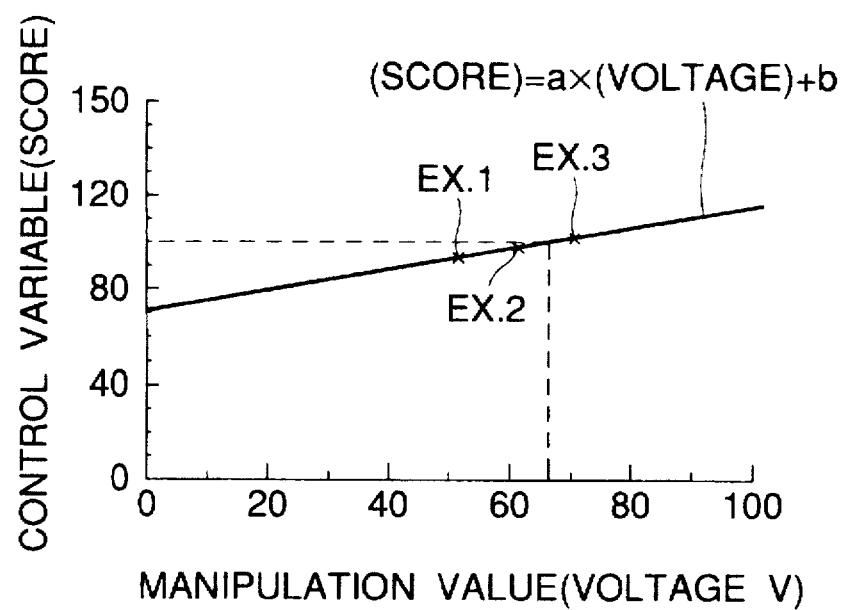
FIG. 2 is a schematic representation showing an example plane when the system controller of the first embodiment boots up.

In this embodiment, n=1 and m=1, the relationship between the output score and the preset voltage plotted on a two dimensional plane is grasped by one control rule. In more detail, in this embodiment, this control rule is calculated as a primary approximate line by the least square method. FIG. 2 shows this calculation. Specifically, the corrected rule preparation section 12 obtains coefficients a and b which can be approximated to the following equation.

(Output score)=$a$×(preset voltage)+$b$

In this way, when the control rule which grasps the relationship between the controlled variable and the manipulation value is extracted, the correction of the manipulation value for implementing an indicated target output can be easily calculated. In other words, the manipulation value correction computation section 16 can easily calculate the manipulation value on the basis of the control rule (the linear line shown in FIG. 2) prepared by the corrected rule preparation section 12. For example, when the target output value is output score=100, it is possible to infer that the manipulation value should be set to 66V.

The manipulation value correction computation section 16 transmits the calculated manipulation value to the preset manipulation value output section 17, and sets a new manipulation value. The system 1 to be controlled is controlled by the thus obtained preset manipulation value.

(3) Correction of Control Rule and Preparation of Cluster

The system controller 2 verifies whether or not a practically obtained system output is the same as the target value after the completion of the above mentioned control operations. Specifically, in the previously mentioned embodiment, it is verified whether or not the system output is 100. In this embodiment, an allowable output error is set to less than ±2. Hence, in the case of the above embodiment, if the output score is more than 98 and less than 102, it results in that control could be carried out with superior accuracy. If the control was exercised with superior accuracy, it can be understood that the control rule used for the control this time was appropriate. This means that information included by the contents of the control this time is already contained in the information which has been already obtained (the control rules extracted from the examples 1 to 3 in this case), and it is unnecessary to additionally store the information.

Or to put it in another way, if the contents of control this time are plotted on the two dimensional plane shown in FIG. 2, a control rule (more specifically, the coefficients a and b of a primary approximate linear line) obtained as a result of the plotting is essentially unchanged, and hence it is unnecessary to correct that control rule.

For these reasons, when the system output has achieved the target value within tolerance, the process goes to subsequent control without a special processing operation.

On the other hand, when the system output goes out of the target value as well as the tolerance, it can be understood that the control rule used to infer the manipulation value was inappropriate. The contents of the control this time is worthy of being stored as a new control example suitable for the current situation of the system. Put it in another way, it is necessary to correct the control rule used for the control this time or prepare a new control rule, using the contents of the control this time as a new control example. The memory control 11 decides whether or not the control example is newly stored.

In this embodiment, there are two cases; namely, where a quantity of state obtained when the system output goes out of the target value as well as tolerance is analogous to a quantity of state of the control example used to extract a control rule (for explanation, the control example this time is referred to as a control example X. The examples 1 to 3 correspond to the control example group X in the foregoing embodiment); and where the quantity of state is not analogous to the quantity of state of the control example. Thus, the correction of a control rule and the preparation of a new control rule are distinguished from each other.

(i) When the control rule is corrected:

In this embodiment, if the time at which the control operation this time is within ten minutes from the time of sampling for the control example group X, the control example this time is added to the control example group X. The thus added control example is used to correct a control rule which will be used for the next control. This is because this control example has a similar quantity of state. An increase in the number of examples results in data having a statistically improved accuracy, whereby the data are corrected so that the control rules apply to control more properly. More specifically, the corrected rule preparation section 12 recalculates the coefficients a and b using four examples resulting from adding the control example this time to the three examples 1 to 3.

(ii) When a cluster is prepared:

If more than ten minutes passed from when the new control example was sampled, the situation of the control system has changed. It can be understood that the control rule induced from the control example group X does not apply to another control. In such a case, it is necessary to sample a control example using a new quantity of state and extract a new control rule.

In other words, the correction rule is not corrected, but a new correction rule must be prepared. Hence, in this case, control operation is executed more than n+1 times from when the system output went out of tolerance and the target value, and a number (n+1) or more of control examples are additionally stored. The reason why the number is set to more than n+1 is the same reason when the system boots up.

During the control executed while a number (n+1) or more of control examples are additionally stored, the control rules are corrected to reduce control errors.

As a result of additional memorization of newly required control examples by repeated execution of the previously mentioned control operations, the control examples are eventually accumulated in the example memory, as shown in, for example, Table 2. The situation as shown in Table 2 is the ordinary situation of the example memory 15 of the system controller according to the present invention.

TABLE 2

| | Quantity of State Year, Month, Day, Hour, Minute, Second | Manipulation Value Set voltage (V) | Controlled Variable Output score |
|---|---|---|---|
| Example 1 | 40525093105 | 50 | 94 |
| Example 2 | 40525093108 | 60 | 99 |
| Example 3 | 40525093158 | 70 | 103 |
| Example 4 | 40525100000 | 62 | 98 |
| Example 5 | 40525100030 | 65 | 99 |
| Example 6 | 40525100100 | 66 | 100 |
| Example 7 | 40525111520 | 53 | 92 |
| Example 8 | 40525111550 | 60 | 95 |
| Example 9 | 40525111620 | 72 | 100 |
| Example 10 | 40525132215 | 52 | 93 |
| Example 11 | 40525132245 | 60 | 97 |

TABLE 2-continued

|  | Quantity of State Year, Month, Day, Hour, Minute, Second | Manipulation Value Set voltage (V) | Controlled Variable Output score |
|---|---|---|---|
| Example 12 | 40525132315 | 71 | 103 |
| Example 13 | 40525164120 | 55 | 94 |

In this embodiment, control examples having similar quantities of state are collected into a cluster. The creation of the cluster is shown in Table 3. Table 3 is for convenience in illustrating the operation of the system controller. In practice, each control example included in a cluster is deleted from the example memory 15 at the same time the cluster is completed. This is because all information items each control example retains are included in the control rule extracted from the cluster (in the embodiment, the coefficients a and b). Hence, it becomes unnecessary to store and save the information, thereby preventing a needless increase in the required storage capacity of the example memory 15. Therefore, the example memory 15 is not yet completed as a cluster, and only control examples recently sampled (the example 3 in the illustrated embodiment) are stored in the example memory 15. On the other hand, control rules corresponding to a completed cluster are stored in the corrected rule preparation section 12. Specifically, as shown in Table 4, examples and control rules (control rules corresponding to a completed cluster) are stored in such a way that they are separated from each other.

TABLE 3

|  | Quantity of State Year, Month, Day, Hour, Minute, Second | Manipulation Value Set voltage (V) | Controlled Variable Output score | Cluster Coefficients a/b Time |
|---|---|---|---|---|
| Ex. 1 | 40525093105 | 50 | 94 | 0.45/72 |
| Ex. 2 | 40525093108 | 60 | 99 | 40525093158 |
| Ex. 3 | 40525093158 | 70 | 103 | |
| Ex. 4 | 40525100000 | 62 | 98 | 0.50/67 |
| Ex. 5 | 40525100030 | 65 | 99 | 40525100100 |
| Ex. 6 | 40525100100 | 66 | 100 | |
| Ex. 7 | 40525111520 | 53 | 92 | 0.42/70 |
| Ex. 8 | 40525111550 | 60 | 95 | 40525111620 |
| Ex. 9 | 40525111620 | 72 | 100 | |
| Ex. 10 | 40525132215 | 52 | 93 | 0.49/68 |
| Ex. 11 | 40525132245 | 60 | 97 | 40525132315 |
| Ex. 12 | 40525132315 | 71 | 103 | |
| Ex. 13 | 40525164120 | 55 | 94 | Unfinished |

(4) Control Using Degree of Matching

An explanation will be given of the control operation of the system controller not under the circumstances as shown in Table 4, i.e., not when or immediately after the system controller has booted up, but when the system is in ordinary operation (when a plurality of clusters are formed).

Assume that a user pressed a start button in order to obtain an output from the system 1 to be controlled, the corrected rule preparation section 12 of the system controller 2 refers to both the immediately preceding preset manipulation value which is temporarily stored and a practical output obtained at that time, and calculates a conformity for each cluster. Here, the conformity is acquired by obtaining a difference between an inferred value of each controlled variable, obtained by holding the immediately preceding preset manipulation value for control rules of each cluster, and a practical system output, and by standardizing a reciprocal of the difference (in such a way that a total sum becomes one).

TABLE 4

|  | Quantity of State Year, Month, Day, Hour, Minute, Second | Manipulation Value Set voltage (V) | Controlled Variable Output score |
|---|---|---|---|
| Example 13 | 40525164120 | 55 | 94 |
|  | Preparation time Year, Month, Day, Time, Minute, Second | | Coefficient a/b |
| Cluster 1 | 40525093158 | | 0.45/72 |
| Cluster 2 | 40525100100 | | 0.50/67 |
| Cluster 3 | 40525111620 | | 0.42/70 |
| Cluster 4 | 40525132315 | | 0.49/68 |

In this embodiment, only five clusters in the order, in which a difference between an inferred value of a controlled variable and a practical system output is small, are used as similar clusters. If the number of clusters present in the memory is less than five, similar calculation is carried out using only the existing clusters. For this reason, even in the case where there is only one cluster in the memory immediately after the system has booted up, the same calculation method can be used.

The conformity thus obtained is used as weight, and a control rule of each similar cluster is averaged by weighing, whereby a new control rule is created by synthesizing this average.

For example, the coefficient a is averaged by weighing, so that a' is obtained. A coefficient b' is obtained so that an approximate line defined by this coefficient crosses a practical system output. In other words, a control rule which provides the following expression is created.

(Control variable)=$a'$×(preset manipulation value)+$b'$

Subsequently, the manipulation value correction computation section 16 obtains a preset manipulation value from the thus obtained control rule which causes the controlled variable to be a target output. The manipulation value correction computation section 16 then sets the system 1 to be controlled via the preset manipulation value memory 17, whereby control operation is executed.

As with the case where the start up of the system has completed, it is decided whether or not the contents of the control this time should be additionally stored by comparing a new control result (a system output) with tolerance. If it is impossible for the rule, synthesized by using the conformity, to cause the difference to fall with tolerance, the correction of the control rule or the preparation of a new control rule will be carried out, as required, to prepare for the next control.

(Effects of First Embodiment)

The following effects are obtained from this embodiment.

(1) The system becomes operable only by the start-up operation as previously mentioned. Therefore, data sampling and associated optimizing operations which are inevitable for this type of conventional system become completely unnecessary.

Namely, to optimize a system allowing for its environment and variations occurring with time, it was conventionally necessary to set the environment in various ways, to sample enormous volumes of data, and to conduct a running experiment over a long period of time. Moreover, an environment laboratory was necessary to carry out the above operations. Thus, the optimization of the conventional system requires extremely large costs such as facility and labor costs. In contrast with this, this embodiment has an advantage that these costs can be substantially cut to zero. Further, the system controller of this embodiment does not need the conventional optimizing operations which require expert knowledge, and hence it becomes easy to recruit development engineers.

Furthermore, it is necessary to boot up the system only once in order to render the system controller of this invention operable. The quality of this operation has no effect on the performance of the system controller which is in operation, and therefore experienced engineers are not required. In other words, it is possible for everybody to boot up the system in one operation and to get the maximum performance of the system controller.

The system controller of this invention can judge whether a result of executed control is bad or good by itself, and can improve its own controllability by automatically in a self-supporting manner. In the conventional fuzzy control method and neural network method, if fuzzy rules and teaching signals which the system previously studies are not optimum, the performance of the system when it is in operations will be insufficient. It is necessary for development engineers to carry out development by trial and error for a long period of time in such a way that optimum fuzzy tuning is obtained. More elementary research and study are necessary to determine appropriate teaching signals, thereby resulting in a greater dependency on the ability of engineers. According to the present invention, it becomes possible for everybody to develop the best controller.

Further, according to the present invention, studying of the system controller only needs the memorization of control examples into a memory. A control rule can be instantaneously executed by a simple arithmetic calculation based on a control example. Accordingly, neither trial-and-error tuning carried out by engineers in the case of conventional fuzzy control nor studying carried out for a long period time in the case of a neural network become completely necessary. Accordingly to the present invention, automatic real-time studying and tuning which were impossible for the conventional technologies to carry out become possible.

(2) According to this embodiment, the control operations can be executed only based on past control examples, and hence it is not necessary to model the system to be controlled. Specifically, according to the present invention, even if an object to be controlled is a black box, it becomes possible to control the object just as it is. For this reason, it becomes possible for controller development engineers to develop a controller having a sufficient performance without deep comprehension of a detailed physical mechanism of the system to be controlled, which makes it possible to reduce the number of development processes.

(3) The preset manipulation value can be directly used as an element of a control example, and therefore the sensing of physical quantities which will be elements of the control example becomes unnecessary. For this reason, sensor costs can be deleted.

Conventionally, even if some control method is most desirable in view of its performance, it is often impossible to implement that control method, because a suitable sensor is not available (since the sensor is too expensive to purchase or no sensor having a sufficient performance is available). However, according to the present embodiment, the free selection of methods becomes possible without undergoing restrictions of a sensor. Thus, the selection of an optimum method results in improved performance.

(4) According to this embodiment, even if an example which is sufficiently analogous in situation to where the system operates is not found in past examples, a plurality of past control rules can be appropriately used in combination using the conformity. Hence, it is possible to execute highly accurate system control.

Further, according to this embodiment, if a desired control accuracy cannot be achieved by such a method, the system controller automatically additionally stores control examples, whereby the system controller can improve its own controllability autonomously.

With such a configuration, even if the user starts up this system under circumstances which are out of the assumption the engineers made at the time of development, the system itself can study so as to operate in an optimum way.

For example, as previously mentioned, an environment test was conventionally carried out. However, it is practically impossible to sample data under every possible situations in view of timing constraints and the constraints of the number of processes or in view of facilities of the laboratory. Hence, in the prior art, the sampling of data is carried out by selecting some of representative conditions. Specifically, if two conditions, for example, temperature and humidity are selected, tests are conducted with respect to a high-temperature and high-humidity condition and a low-temperature and low-humidity condition. If optimizing operation is carried out only based on data obtained as a result of the tests, it will be difficult to obtain a sufficient control accuracy when the user operates the system under conditions other than them. Although optimization has been completed for temperature and humidity, special attention is paid to an influence of variations in pressure during development. In such a case, if the system is used at a place where air pressure is different, for example, at a high land or inside a plane, the performance of the system will deteriorate.

However, according to the present invention, even in such a case, the system itself carries out learning in such a way as to obtain sufficient control accuracy under the circumstances under which the system is used. Hence, the system to be controlled can constantly deliver its best performance.

According to this embodiment, as with the above descriptions, if the system to be controlled deteriorates with time, the system controller can exercise control while constantly studying an influence of deterioration. Hence, best control becomes possible constantly.

Even when wasted components are replaced with new components, the system controller can adjust the system to be controlled by automatic studying action without manual readjustment of the system by the user or a serviceman.

(5) According to this embodiment, it is possible to accurately select only the control examples having the least importance and to delete the thus selected examples from the memory. Accordingly, it is possible to prevent the case where newly required control examples and clusters cannot be stored by the exhaustion of a memory. It is possible to design a memory with the minimum required storage capacity, the cost of the system controller can be reduced. A memory having a limited storage capacity can be most effectively used.

Particularly, as with this embodiment, if time is adopted as a quantity of state, and if examples or a group of examples which form constituent elements of a cluster are deleted in a packaged manner from the memory when the cluster is completed, the storage capacity of the memory used for storing examples can be minimized.

(Modified Example)

(1) A method of deriving a control rule may be another method other than the primary approximation using the least square method. In other words, any method may be acceptable so long as the method can grasp the relationship between a number (m) of types of controlled variables within an n+1 dimensional space and a number (n) of types of manipulation values as a number (m) of quantitative relationships. Therefore, more higher order approximate calculation may be executed. Alternatively, a method of causing a neural network to study is also acceptable. However, in the case of the studying of a neural network, it takes time more than a predetermined level. For this reason, this may often be unsuitable for a system controller which requires a high speed of response.

As a matter of course, when a number (m) of types of independent controlled variables are simply controlled by using a number (n) of types of independent manipulation values, n=m. However, if there is another defined relationship between a number (n) of types of manipulation values, or if a number (m) of types of controlled variables are not independent from each other, n≈m.

Figure 3:
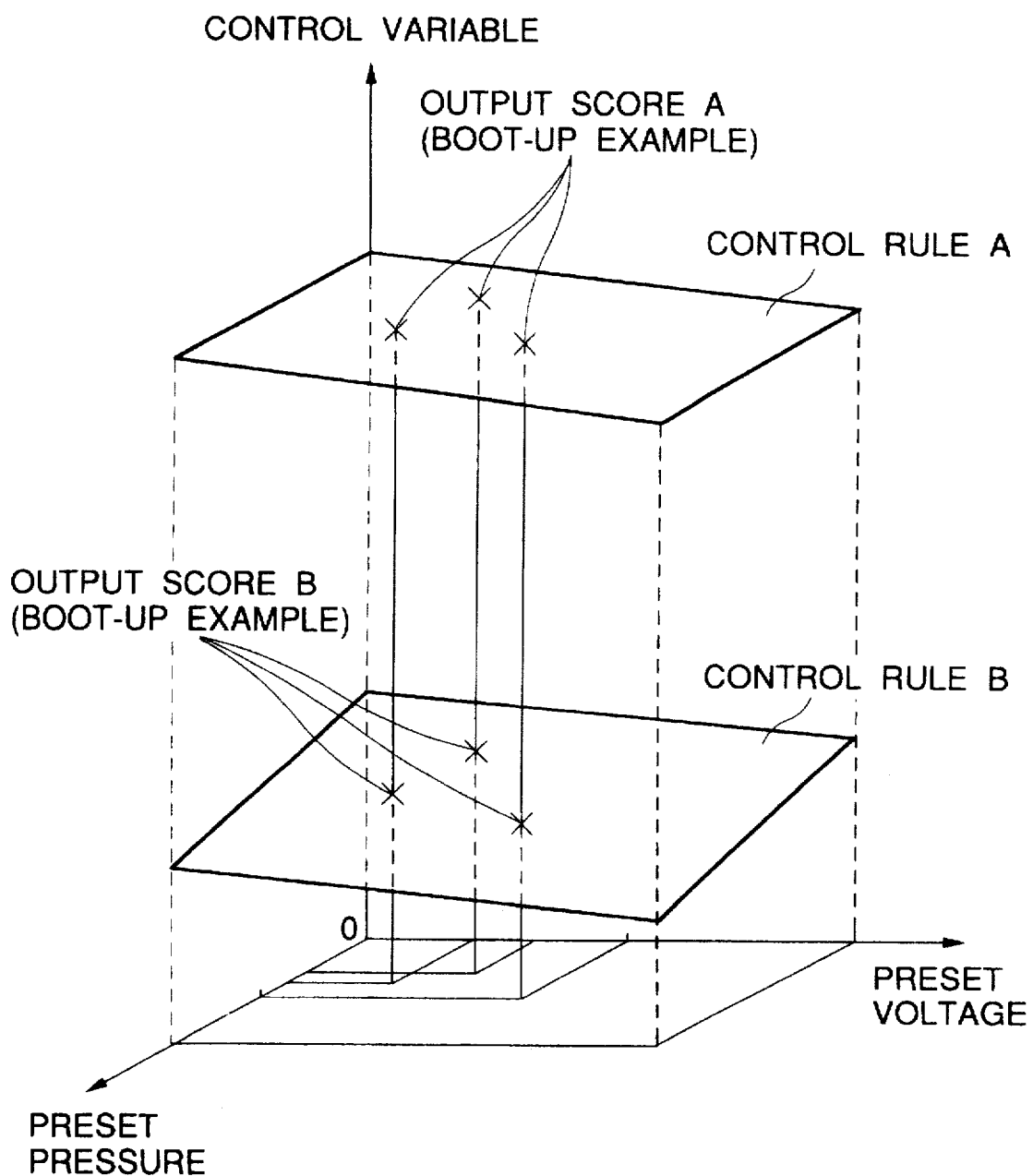
FIG. 3 is a plot showing a control example space when the system controller of the first embodiment adopts two manipulation values and two controlled variables.
Figure 4:
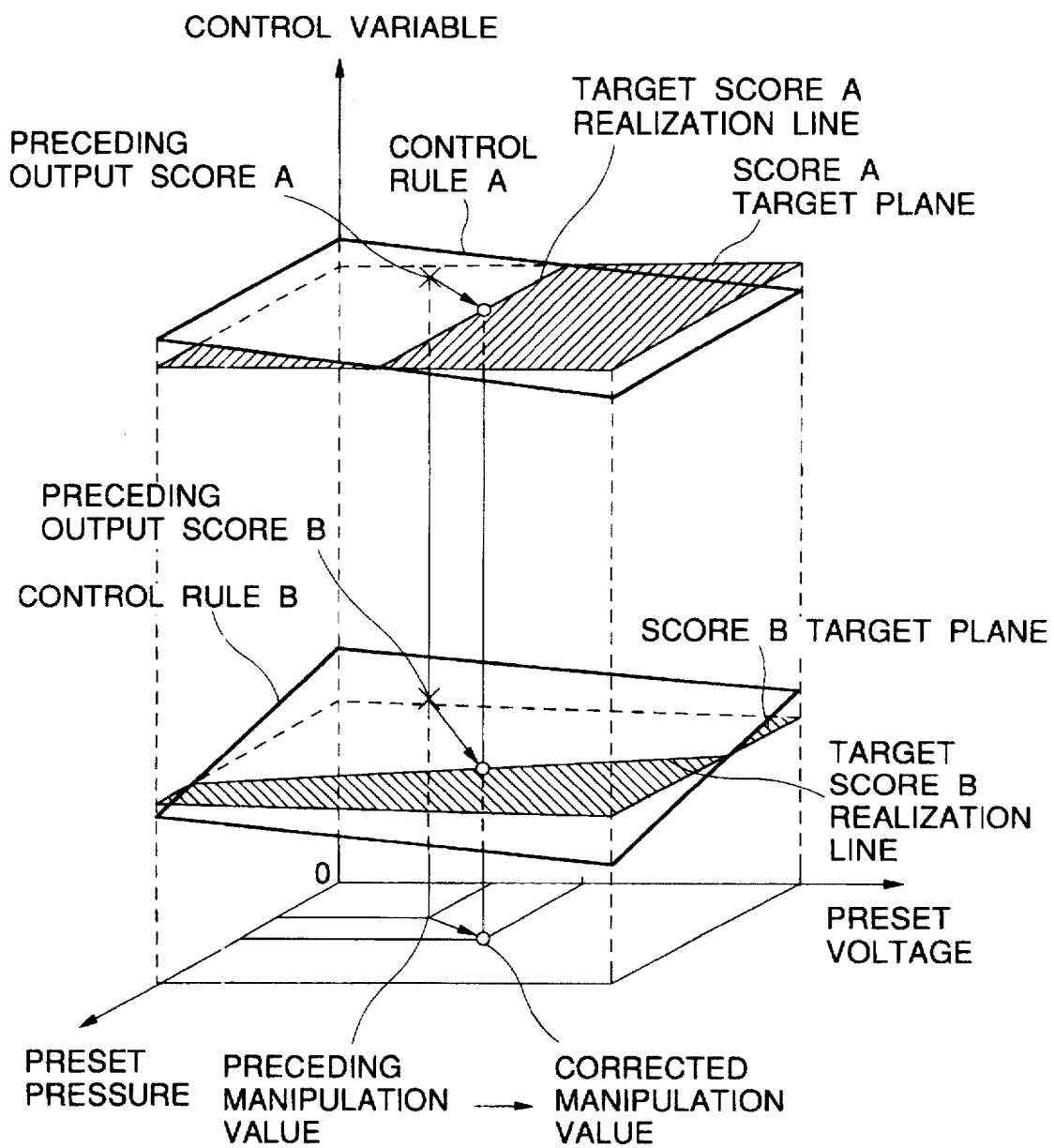
FIG. 4 is a plot for illustrating a manner of obtaining corrected values of the manipulation values in the case as shown in FIG. 3.

(2) For the system controller which comprises two types of manipulation values, i.e., preset voltages and preset pressure values and is arranged so that a controlled variable is made of output scores A and B, each example is plotted in a three-dimensional space as shown in FIG. 3. In this space, a plane A which represents the relationship between the preset voltage and the preset pressure with respect to the output score A, and a plane B which represents the relationship between the preset voltage and the preset pressure with respect to the output score B are calculated using the least square method. These two planes A and B represent a control rule. If the output scores A and B are physical quantities having different dimensions, it goes without saying that two n+1 dimensional spaces, each having its own longitudinal axis, are used.

If a manipulation value in the case of n=2 and m=2, as shown in FIG. 3, is obtained, linear lines passing through intersections between the scores A and a score A target plane and linear lines passing through intersections between the scores B and a score B target plane are obtained. These linear lines serve as target realization lines of the scores A and B. To use both scores A and B as target values at the same time, each of the target realization lines of both scores A and B is projected onto a plane defined by a preset voltage axis and a preset pressure axis, and a preset voltage and a preset pressure corresponding to an intersection between the plane and the target realization line are adopted. The thus obtained voltage and pressure value become post-correction manipulation values.

Figure 5:
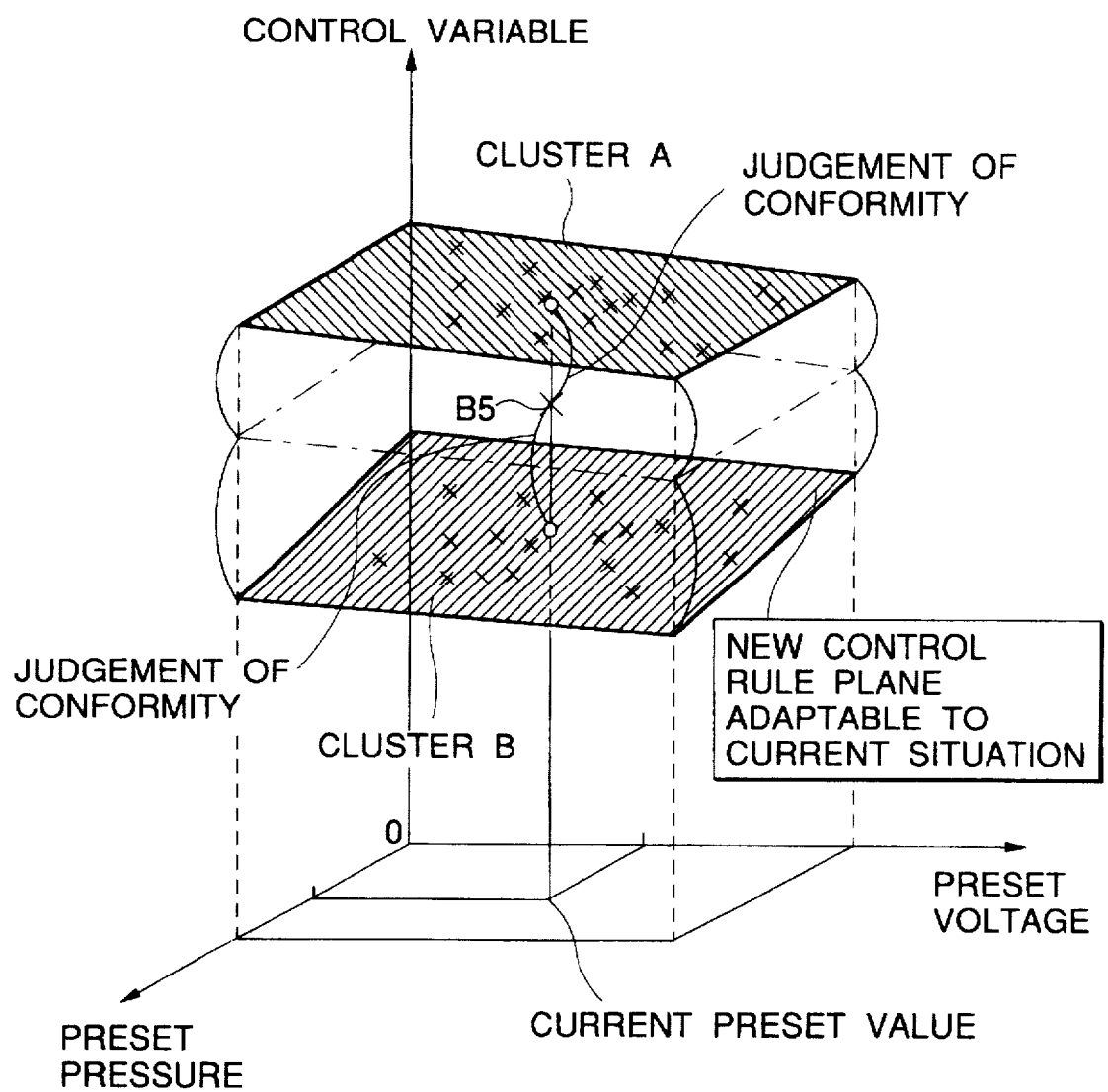
FIG. 5 is a plot for illustrating a method of calculating a conformity when control plates are used.

An example of calculation of a conformity when control rules for plane are prepared within a three-dimensional space will be described with reference to FIG. 5. FIG. 5 shows the case where a cluster A plane and a cluster B plane are formed with respect to the score A. A newly plotted point B5 is situated in neither the cluster plane A nor the cluster plane B. At this time, a distance between the point representing the contents of the current control in the coordinate space, i.e., the point B5 and each plane of control example is calculated. A reciprocal of the thus calculated distance is standardized. In other words, the sum of reciprocals of distances between the point B and the planes of control examples becomes one. The thus standardized values are synonymous with the conformity in the previously mentioned embodiment (the conformity in the case of a linear line). Inclinations in each coordinate axis direction in each plane of example are weighted corresponding to the conformity, and the weighted inclinations are summed. The sum of the quantities is taken as an inclination in each coordinate axis direction of a new control example plane compatible with the current state. The contents of the current control are aligned to such a height (an intercept on the controlled variable axis) that the contents are included in the plane defined by the height, whereby a composite rule is prepared.

(3) For the system in which the quantity of state is unchanged and the detection and memorization of the quantity of state are unnecessary, it is possible to exercise control using only a manipulation value and a controlled variable. In such a case, the configuration of the system becomes simple.

(4) In the above embodiment, control is exercised after the conformity between clusters has been obtained. Alternatively, a cluster having the closest quantity of state is identified, and a control rule extracted from this cluster may be used for control.

(5) The conformity used in this embodiment may be defined using any definition method so long as the method can represent a conformity objectively and univocally for each cluster.

(6) In this embodiment, tolerance of the controlled variable is judged, and control is exercised in response to the result of that judgement. If a range of variations of the controlled variable is previously known, and if the range is narrow, the judgement of tolerance is omitted, and all of control examples are stored.

(7) In place of, or in addition to, the memory management carried out in this embodiment, the following memory managements may be carried out.

1. If the storage capacity of the example memory 15 becomes insufficient, the oldest control example is deleted.

2. If the storage capacity of the example memory 15 becomes insufficient, the oldest cluster is deleted.

3. The example memory 15 stores, as elements of a control example, the time at which a control example arises and the number of times that control example has been used to decide a manipulation value. If the storage capacity of the example memory 15 becomes insufficient, the control example which was stored before a predetermined time and was used the least number of times is deleted.

4. The example memory 15 stores, as elements of a cluster, the time at which a control example arises and the number of times that control example has been used to decide a manipulation value. If the storage capacity of the example memory 15 becomes insufficient, the cluster which was stored before a predetermined time and was used the least number of times is deleted.

5. The example memory 15 stores, as elements of a cluster, a cumulative conformity when a control example arises and the number of times that control example has been used to decide a manipulation value. If the storage capacity of the example memory 15 becomes insufficient, the cluster which was stored before a predetermined time and was used the least number of times is deleted.

Second Embodiment:

(Configuration of Robot Arm According to Second Embodiment)

Figure 6:
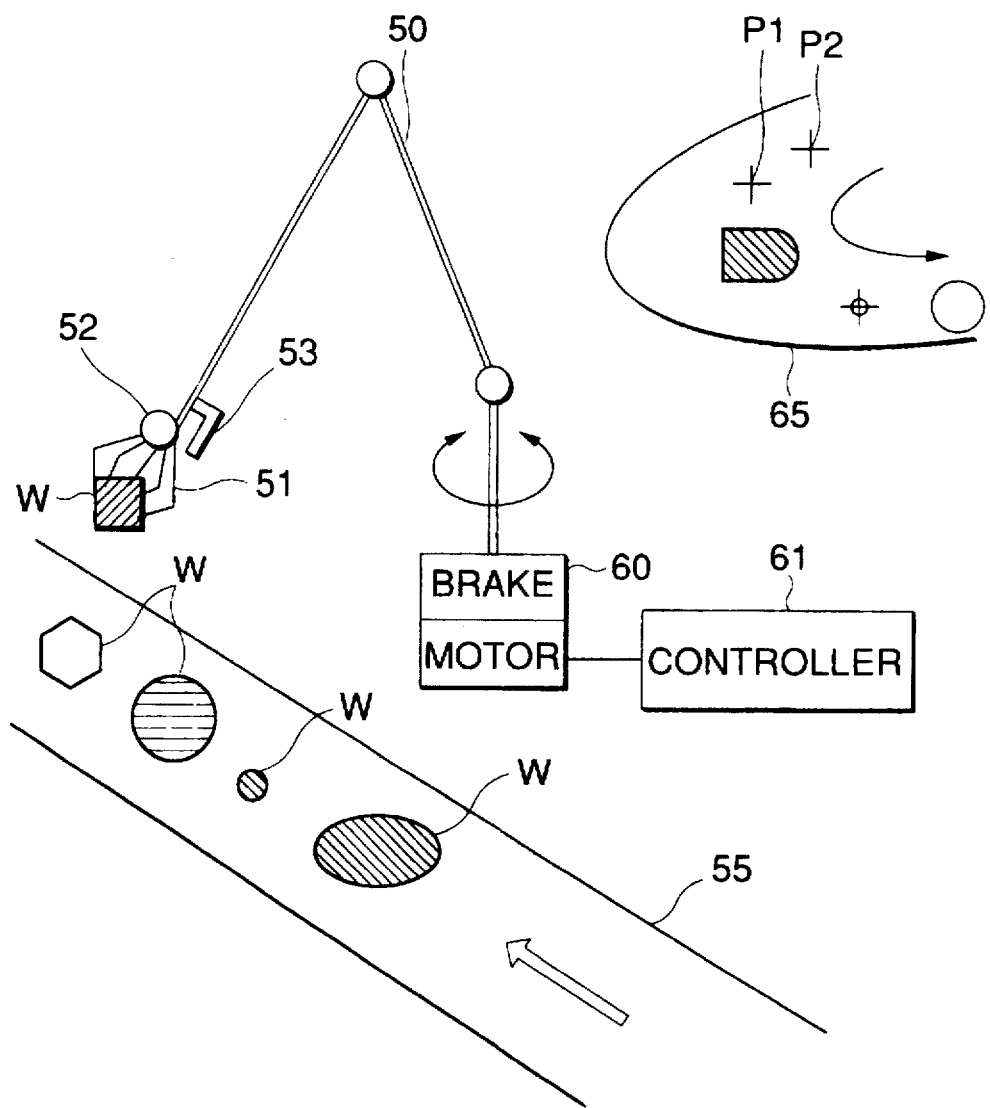
FIG. 6 is a schematic representation showing the overall configuration of a system controller according to a second embodiment of the present invention.
Figure 7:
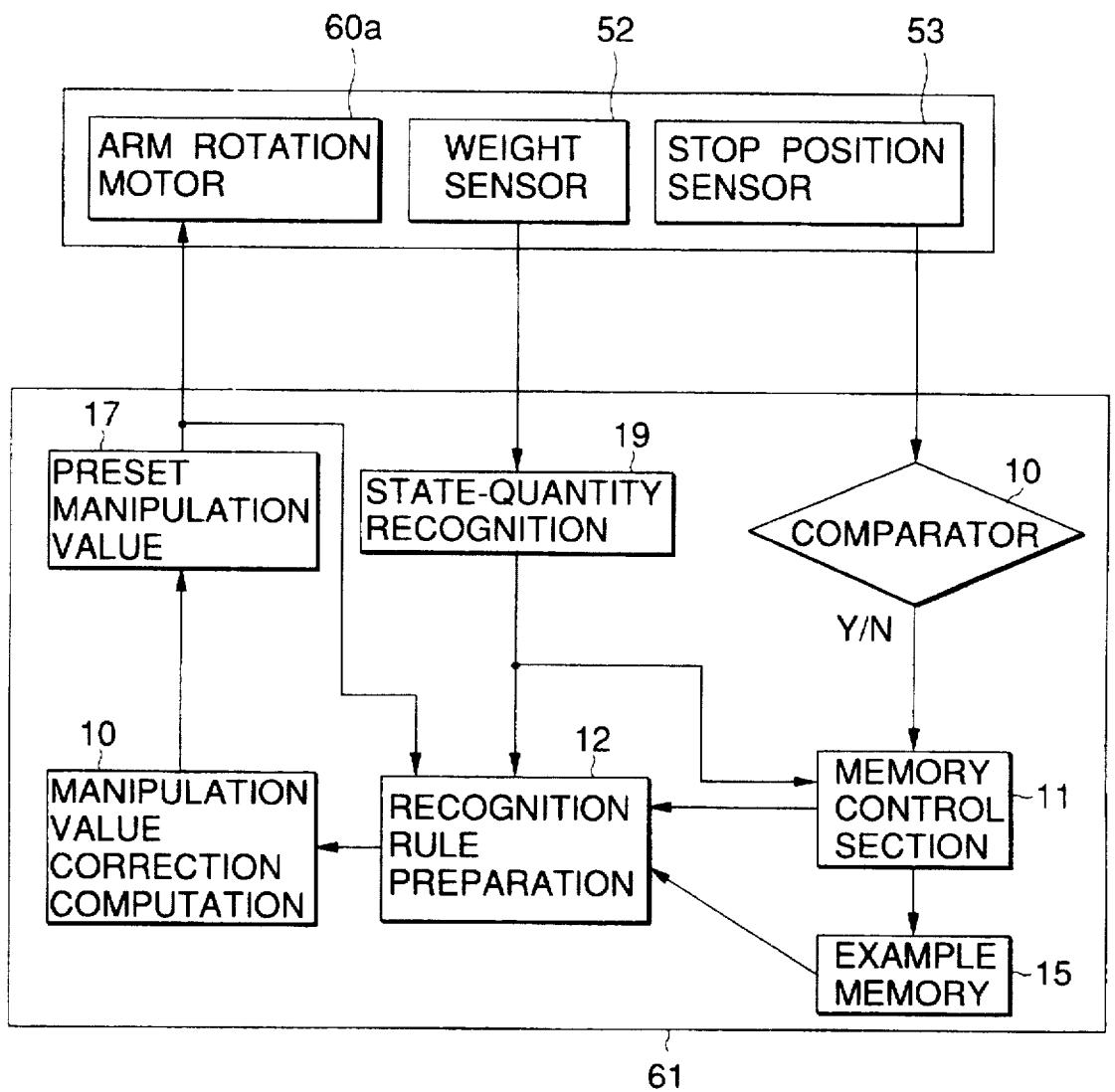
FIG. 7 is a block diagram showing the configuration of the system controller according to the second embodiment.

With reference to FIGS. 6 and 7, a robot arm according to a second embodiment of the present invention will now be described. FIG. 6 is a schematic representation showing a configuration of a robot arm according to the second embodiment, and FIG. 7 is a block diagram showing a configuration of a control section of the same embodiment. In FIG. 7, the same reference numerals are provided to designate corresponding features shown in FIG. 1, and the explanation thereof will be omitted here for brevity.

This embodiment is an example in which the present invention is applied to the control of a motor whose load arbitrarily changes. More specifically, an example of drive control of a robot arm which swiftly transfers various workpieces W made of light and heavy workpieces and places the workpiece at a desired location with high accuracy. Further, in this embodiment, it is requested that a robot arm moves as rapidly as possible irrespective of the weight of an article, and that an electric energy is supplied to a motor so as to make it possible to stop the robot arm at a specified location within tolerance with superior accuracy.

In FIG. 6, a hand 51 is provided at the leading edge of a robot arm 50 for grasping a workpiece W, and a weight sensor 52 for detecting the weight of the workpiece W and a stop position sensor 53 are also provided at the edge of the robot arm 50.

The robot arm 50 is actuated by a robot actuator 60 having a motor and a braking mechanism, and the robot actuator 60 is controlled by a controller 61. In this case, the robot arm 50 grasps the workpiece W carried on a belt conveyor 55 using the hand 51. The thus grasped workpiece W is placed at a target stop position P1 or P2 set on a turn table 65. The braking mechanism provided inside the robot actuator 60 is carrying out constant decelerating action.

As shown in FIG. 7, the controller 61 has the same configuration as the system controller 2 of the first embodiment (see FIG. 1). In this case, the system to be controlled is a robot system made up of the robot actuator 60 and the robot arm 50. An output signal from the stop position sensor 53 is a controlled variable, and an output signal from the weight sensor 52 is a quantity of state.

Practical errors of a stop position in relation to the target stop position are discriminated from each other by (−) when the workpiece W is placed much short of the target stop position and (+) when the workpiece W is placed much outside of the target. The amount of error is evaluated in millimeters. An error within ±3 mm is set as tolerance.

To rapidly move the robot arm 50, all that needs to be done is to supply a larger energy as an article is heavier. However, the robot arm grasping a heavy article has greater inertia, and it becomes difficult for the robot arm to instantaneously stop at the target stop line with high accuracy. For this reason, it is important to decide an optimum quantity of electric energy to be supplied to a motor in order to make a transfer rate and a stop position accuracy compatible with each other.

The relationship between the transfer rate and the stop position accuracy with respect to the weight of an article is nonlinear and complicated. To effect optimum control using the prior art, an experiment must be previously conducted using various articles, and engineers have to previously prepare the optimization of a feedback gain and the switching of a feedback gain corresponding to the weight of the article through a lot of development processes. In this embodiment, these prior preparations are unnecessary, and optimizing control can be easily exercised.

(Operation of Robot Arm According to Second Embodiment)

(1) Initial Setting Operation

The operation of the robot arm having the previously described construction, according to the second embodiment, will now be described. First, initial setting operation will be described. Even in this embodiment, as with the previously mentioned first embodiment, the following start-up operations are necessary. It is necessary to carry out this start-up operations only once to render the robot arm in an operating state. The quality of this operation does not affect the performance of the robot arm when it is in operation at all.

To being with, an engineer causes the robot hand 51 to grasp a workpiece W having an appropriate weight and manually sets a suitable current to be supplied to a motor (a manipulation value). The robot controller 60 is operated under that setting. As a result of this, the robot arm 50 turns to place the workpiece W at either the target position P1 or the target position P2. A displacement of the stop position (a controlled variable) is detected by a stop position sensor 53, and the thus detected value is supplied to the controller 61. The weight of the workpiece W (a quantity of state) is detected by a weighing sensor 52, and the thus detected weight is also supplied to the controller 61. A first example (a manipulation value, a controlled variable, and the combination of quantities of state) which is a result of the above described processing is stored in the example memory 15.

Subsequently, setting and changing a current to be supplied to the motor within tolerance, the engineer repeatedly carries out similar processing more than n+1 times, whereby examples of more than n+1 are stored in the example memory 15. At this time, the weight of the workpiece W which is a controlled variable may be constant.

Here, n shows the type of a controlled variable and is n=1 (a current value supplied to a motor) in this embodiment. For this reason, the engineer makes current values supplied to the motor differ from each other, and examples are sampled more than twice.

Control examples obtained when the robot system boots up are stored in the example memory 15 in the form as shown in, for example, Table 5. Quantities of state of the control examples stored in the example memory 15 are compared with each other, and the control examples which are similar in the quantity of state to each other are collected into a cluster.

TABLE 5

|  | State of Quantity Weight of article (Kg) | Manipulation Value Current value (0–255) | Controlled Variable Positional error (mm) |
| --- | --- | --- | --- |
| Example 1 | 5.5 | 100 | −7 |
| Example 2 | 5.5 | 160 | +9 |

In this embodiment, examples which are different in weight from each other in a range of ±10% are handled as similar examples. This is because the relationship between the current value supplied to the motor and the stop position accuracy is almost constant so long as weight variations are in the range of ±10%. Hence, the examples obtained when the robot system boots up shown in Table 5 are classified into the same cluster. A mean value of the quantities of state of the control examples within the cluster is used as a quantity of state of that cluster.

All of the control values belonging to the thus obtained cluster are plotted in an n+1 dimensional space comprised of a manipulation value and a controlled variable. In this embodiment, the manipulation value is only a preset current to be supplied to a motor (i.e., n=1), and hence each control example is plotted on a two-dimensional plane.

Figure 8:
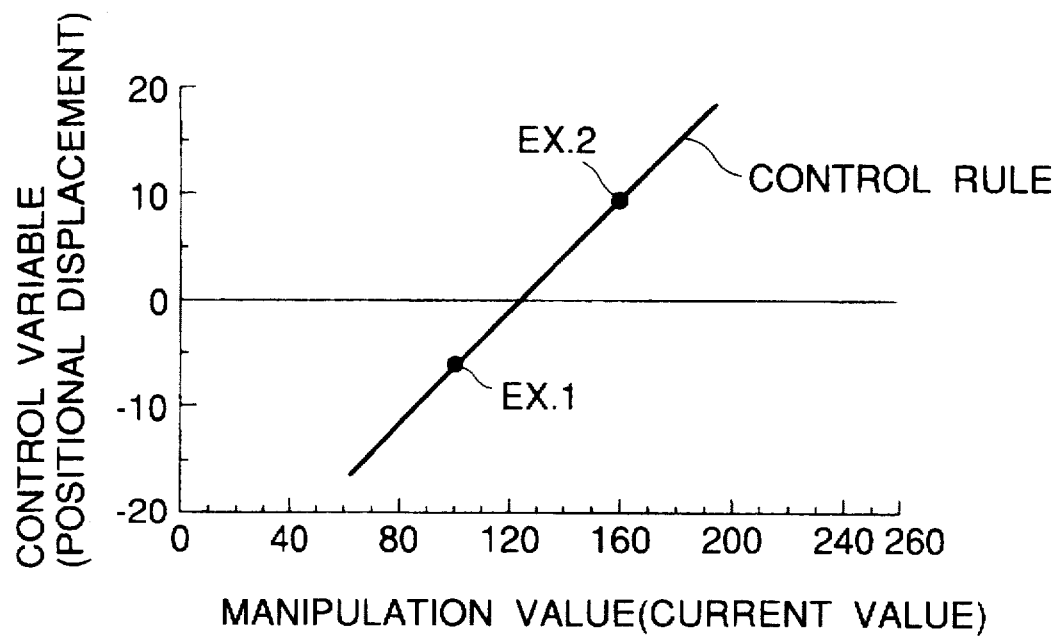
FIG. 8 is a plot for illustrating a control rule when the system controller of the second embodiment boots up.

The corrected rule preparation section 12 extracts the relationship between the controlled variable and the manipulation value within the n+1 dimensional space as a control rule. More in detail, this control rule is calculated as a primary approximate line using the least square method. The control rule thus obtained is shown in FIG. 8. As can be easily seen from FIG. 8, the coefficients a and b which can make approximations in the manner as shown below.

(Positional displacement)=a×(preset motor current)+b

The method of deriving control rules is not limited to any specific method. Any methods can be employed so long as the methods make it possible to grasp the relationship between a number (m) of types of controlled variables and a number (n) of types of manipulation values as a number (m) of quantitative relationships. Explanations of the methods are the same as mentioned in the first embodiment. The booting operation is completed through the above processing.

(2) Operation of Robot System When System is in Operation
(i) Control Using Degree of Matching of Cluster The operation of the robot system when it is in practical operation after the booting operation has been completed will be described.

The robot first starts to operate and grasps a workpiece W. Then, a weight signal representing the weight of a workpiece W is output from the weight sensor 52. The corrected rule preparation section 12 compares the weight signal to be supplied and a quantity of state of each cluster, whereby a conformity is determined.

Specifically, a difference (a mean weight) between the workpiece W grasped by the robot arm 50 and a quantity of state of each cluster is obtained. A reciprocal of the difference which is standardized for all clusters is calculated as a conformity. In this case, there is only a cluster made of two control examples obtained when the robot system boots up, and hence this cluster has a conformity of 100%.

In this way, after a conformity of each cluster has been obtained, control rules extracted from each cluster are averaged by weighing corresponding to the conformity, and a synthetic control rule is calculated. Control calculation is then executed using this synthetic control rule.

In this case, the conformity of the cluster when the robot system boots up is 100%, and hence the control rules extracted from the cluster when the robot system boots up are directly used in control calculation as the synthetic control rule.

Subsequently, the manipulation value correction computation section 16 obtains a preset motor current value, which suppresses a positional displacement to zero, from the synthetic control rule. A current value corresponding to this preset motor current value is supplied to a motor 60a for rotating an arm, and first control operation is executed.

It is judged whether or not the workpiece W is placed at the target position P1 or P2 with high accuracy as a result of the transfer of the workpiece carried out in the manner as previously mentioned. The comparator 10 makes this judgement on the basis of an output signal from the stop position sensor 53. If a positional displacement is more than ±3 millimeters, a set of the weight of the workpiece W this time (a quantity of state), the preset motor current value (a manipulation value), and the positional displacement (a controlled variable) is stored in the example memory 15 as a new control example.

On the other hand, if the positional displacement is less than ±3 millimeters, this means that the example obtained as a result of the control this time is contained in the already obtained example (i.e., the control rules extracted from the cluster made of the examples 1 and 2 when the robot system boots up). Therefore, it is unnecessary to additionally store this example. The processing proceeds to the next control without carrying out special processing.

(ii) Correction of Control Rule and Generation of New Cluster

In this embodiment, the processing of the newly additionally stored control example is distinguished depending on where a quantity of state of the control example is analogous to a quantity of state of an existing cluster and where the quantity of state of the control example and the quantity of state of the existing cluster are dissimilar to each other.

In other words, if a quantity of state of the newly additionally stored control example (the weight of a workpiece transferred this time) has a difference within ±10% when compared with a quantity of state of an existing cluster, the newly stored control example is additionally classified into that cluster, and the control example is used to correct a control rule extracted from that cluster. This correction of the control rule is intended to statistically improve the accuracy of data by increasing the number of examples, and to make the control rule more applicable.

If the difference is outside of ±10%, that control example is not classified into the existing cluster, and a new cluster (for example, a cluster B) is created. Then, the control example is classified into the thus newly created cluster. If another control example to be classified into the cluster B is produced through subsequent control operations, the control rule in the cluster B is extracted, and this control rule is applied to the control thereafter.

New control examples are additionally stored by repeatedly executing the above control operations. In due time, control examples, for example, shown in Table 6 accumulate in the control example memory 15. Table 6 shows a common state of the control example memory 15 of the second embodiment.

TABLE 6

|  | State of Quantity Weight of article (Kg) | Manipulation Value Current value (0–255) | Controlled Variable Positional error (mm) |
| --- | --- | --- | --- |
| Ex. 1 | 5.5 | 100 | −7 |
| Ex. 2 | 5.5 | 160 | +9 |
| Ex. 3 | 2.9 | 52 | −5 |
| Ex. 4 | 6.7 | 110 | −4 |
| Ex. 5 | 11.2 | 232 | −4 |
| Ex. 6 | 2.7 | 76 | +8 |
| Ex. 7 | 6.3 | 121 | +5 |

(iii) Control in Common Operating State

An explanation will be given not of control operations under the circumstances shown in Table 6, that is, immediately after the robot system has booted up, but of control operations in a common operating state after control has been executed up to a point.

When the robot arm 50 holds the workpiece W under these circumstances, the weight sensor 52 detects the weight of the workpiece. The thus detected weight is compared with a quantity of state of each cluster, whereby a conformity is calculated.

After the conformity of each cluster has been calculated, control rules extracted from each cluster are averaged by weighing corresponding to the conformity, whereby a synthetic control rule is calculated. A motor current value which suppresses a positional displacement to zero is calculated on the basis of this synthetic control rule, and the motor 60a for rotating the arm is controlled.

If the positional displacement is outside of tolerance (±3 mm), the control example this time is stored in the control example memory 15. When the workpiece W could be positioned with superior accuracy, the example is not stored and the next control is executed.

The control operations are exercised in the manner as previously mentioned under the common operating circumstances. The operation procedures themselves are completely the same as the procedures performed immediately after the robot system has booted up. However, there are a wealth of clusters under the common operating circumstances, and hence there are a lot of control rules extracted from the clusters. This is the only difference between the common operating circumstances and the circumstances immediately after the robot system has booted up. As is evident from this fact, totally the same processing are carried out immediately after the robot system has booted up or after control operations have been performed over a long period of time. It is unnecessary to distinguish these two circumstances. Accordingly, it is possible to use the robot system in totally the same manner immediately after the robot system has booted up over a long period of time.

(Effects of Second Embodiment)

The second embodiment yields the following effects.

(1) Data sampling and associated optimizing operations which are inevitable for this type of conventional system become completely unnecessary, which makes it possible to significantly reduce the number of steps of development. Further, expert knowledge about the mechanism of a robot and the control technology becomes unnecessary, and hence skilled development engineers become unnecessary.

(2) The control system itself judges control results (a stop position accuracy) and determines whether or not control examples are added. Hence, the controllability of the system can be automatically and autonomously improved. As already mentioned in the first embodiment, the system of this invention far surpasses the fuzzy control method and the neural network method.

(3) Preset values can be directly utilized as a manipulation value which is an element of a control example, and therefore the sensing of a motor feed current which was conventionally practiced becomes unnecessary. For this reason, a sensor cost such as a cost of an ampere meter can be reduced, and a drop in controllability due to sensing errors can be also prevented.

(4) Under the circumstances which the engineers did not expect, that is, when heavier or lighter workpieces beyond expectations are transferred, the control system itself autonomously carries out studying to improve its controllability so that the best control can be provided.

Similarly, even when the system to be control deteriorates with time, the control system exercises control while constantly studying an influence of deteriorations. Hence, it is possible to constantly provide the best control. For example, even if a braking performance deteriorates with time, it is possible to prevent a drop in stopping accuracy resulting from the deterioration of the braking performance.

(5) Even when wasted parts are replaced with new parts, the system carries out automatic control by means of the automatic studying function of the present invention without manual readjustment of a user or a serviceman.

(Modified Example)

The second embodiment is susceptible to various modifications. However, the modifications which were already described in the first embodiment are applicable to the second embodiment, and hence the explanation of the modifications will be omitted here for brevity.

As mentioned above, the system controller as defined in appended claims makes it possible to constantly realize the best controllability without data sampling and associated optimizing operations which engineers conventionally perform. For this reason, the development cost can be reduced, and sufficient performance can be obtained without skilled engineers.

Further, the present invention makes it possible to realize automatic real-time studying and tuning which were impossible for the conventional fuzzy or neural network technologies.

The present invention requires neither deep comprehension of the system to be controlled nor the modeling of the system and makes it possible to control the system with sufficient accuracy while the system remains a black box.

The present invention also makes it possible to select a control method freed from restrictions of a sensor.

Further, according to the present invention, automatic optimum adjustment is carried out even when the system to be controlled deteriorates with time or when parts are replaced.

According to the present invention, even when examples sufficiently analogous to the conditions under which the system operates are not found in the past examples, it is possible to create a new control rule from the plurality of past control rules.

Further, according to the present invention, the controller itself can voluntarily judge necessity and additionally store control examples, and hence the controller can autonomously improve its own controllability.

Several embodiments of the invention have now been described in detail. It is to be noted, however, that these descriptions of specific embodiments are merely illustrative of the principles underlying the inventive concept. It is contemplated that various modifications of the disclosed embodiments, as well as other embodiments of the invention will, without departing from the spirit and scope of the invention, be apparent to persons skilled in the art.

What is claimed is:

1. A system controller comprising:

manipulation value output means for supplying a manipulation value to a system to be controlled;

control example storage means for storing the manipulation value and a controlled variable which is output from the system in response to the manipulation value as a control example;

control rule extracting means for extracting a control rule from among a plurality of control examples stored in the control example storage means; and manipulation value computation means for calculating a manipulation value which matches the controlled variable with a target figure using said control rule extracted by the control rule extracting means, and causing the manipulation value output means to output the thus obtained manipulation value;

wherein:

said control example storage means stores a set of said manipulation value, said controlled variable and a quantity of state which exerts an influence upon the controlled variable from the system as a control example, and creates a cluster by collecting control examples having similar quantities of state among the control examples stored in the control example storage means;

said control rule extracting means extracts a control rule for each cluster; and said manipulation value computation means calculates a manipulation value which matches the controlled variable with a target figure using a control rule of a cluster, having a quantity of state analogous to a quantity of state obtained when control is exercised, from among the controlled rules extracted by the control rule extracting means.

2. A system controller as claimed in claim 1, wherein said control example storage means stores the contents of associated control example as a new control example into a corresponding cluster when the controlled variable exceeds a tolerance; and said control rule extracting means extracts a new control rule from a cluster which contains the newly stored control example.

3. A system controller as claimed in claim 1, wherein said control example storage means stores a new control example when the controlled variable exceeds a tolerance; and said control rule extracting means extracts a new control rule from a group of control examples which contains the newly stored control example.

4. A system controller comprising:

manipulation value output means for supplying a manipulation value to a system to be controlled;

control example storage means for storing the manipulation value and a controlled variable which is output from the system in response to the manipulation value as a control example;

control rule extracting means for extracting a control rule from among a plurality of control examples stored in the control example storage means; and manipulation value computation means for calculating a manipulation value which matches the controlled variable with a target figure using said control rule extracted by the control rule extracting means, and causing the manipulation value output means to output the thus obtained manipulation value;

wherein:

said control example storage means stores a set of said manipulation value, said control variable and a quantity of state which exerts an influence upon the controlled variable from the system as a control example, and creates a cluster by collecting control examples having similar quantities of state among the control examples stored in the control example storage means;

said control rule extracting means extracts a control rule for each cluster; and said manipulation value computation means obtains a conformity for a control rule extracted by the control rule extracting means, averages each of the control rules by weighing corresponding to the conformity, obtains a manipulation value which matches the controlled variable with a target figure using a synthetic rule obtained as a result of averaging, and causes the manipulation value output means to output the thus obtained manipulation value.

5. A system controller as claimed in claim 4, wherein said control example storage means storing the contents of associated control example as a new control example into a corresponding cluster when the controlled variable exceeds a tolerance; and said control rule extracting means extracts a new control rule from a cluster which contains the newly stored control example.

6. A system controller as claimed in claim 4, wherein said control rule is extracted for each controlled variable as an n-dimensional plane obtained by processing each control example coordinate using a least square method, within an n+1 dimensional space made of the controlled variable and a number (n) of manipulation values associated with the controlled variable; and said manipulation value computation means obtains the conformity by standardizing, within a coordinate space in which each of control rules is described, a reciprocal of distance between an n-dimensional plane representing a control rule and a coordinate representing a control example immediately before the previous control example with respect to each control rule.

7. A system controller as claimed in claim 4, wherein said control example storage means stores a new control example when the controlled variable exceeds a tolerance; and said control rule extracting means extracts a new control rule from a group of control examples which contains the newly stored control example.

8. A system controller comprising:

manipulation value output means for supplying a manipulation value to a system to be controlled;

control example storage means for storing the manipulation value and a controlled variable which is output from the system in response to the manipulation value as a control example;

control rule extracting means for extracting a control rule from among a plurality of control examples stored in the control example storage means; and manipulation value computation means for calculating a manipulation value which matches the controlled variable with a target figure using said control rule extracted by the control rule extracting means, and causing the manipulation value output means to output the thus obtained manipulation value;

wherein said control rule is extracted for each controlled variable as an n-dimensional plane obtained by processing each control example coordinate using a least square method, within an n+1 dimensional space made of the controlled variable and a number (n) of manipulation values associated with the controlled variable.

9. A system controller as claimed in claim 8, wherein said control example storage means stores contents of associated control example as a new control example when the controlled variable exceeds a tolerance; and said control rule extracting means extracts a new control rule from a group of control examples which contains the newly stored control example.

10. A system controller as claimed in claim 8, wherein said control example storage means stores a set of said manipulation value, said controlled variable and a quantity of state which exerts an influence upon the controlled variable from the system as a control example.

11. A system controller as claimed in claim 8, wherein said control example storage means stores a set of said manipulation value, said controlled variable and a quantity of state which exerts an influence upon the controlled variable from the system as a control example, and stores contents of associated control example as a new control example when the controlled variable exceeds a tolerance; and said control rule extracting means extracts a new control rule from a group of control examples which contains the newly stored control example.

12. An image forming apparatus which determines a manipulation value effecting an influence to a control variable of a controlled device so as to achieve a target quality of the control variable, said apparatus comprising:

specify means for specifying a control target value of said control variable;

manipulation value output means for applying a manipulation value to the controlled device;

detection means for detecting the control variable with respect to a currently manipulation value of the controlled device;

control rule memory means for storing a plurality of control rules representing a plurality of control examples which are specified by said manipulation value and said control variable, in a coordinate system of said manipulation value and said control variable;

calculation means for calculating a conformity of the control variable detected by said detection means with all of control rules stored in said control rule memory means;

synthetic means for preparing a synthetic control rule which contains the control example representing said control variable detected by said detection means from said control rules in accordance with said conformity calculated by said calculation means; and determination means for determining a new manipulation value corresponding to said control target value according to said synthetic control rule;

whereby said manipulation value output means is operated by the new manipulation value determined by said determination means.

13. An image forming apparatus as claimed in claim 12, wherein said control rule memory means stores parameters of an equation representive of said control rule in said coordinate system; and said synthetic means comprises:

means for preparing said control rule from said parameters read out from said control rule memory means;

image quality calculation means for calculating a plurality of control variables in accordance with said control rule corresponding to the current manipulation value in such manner that the current manipulation value is substituted into an equation obtained by said preparing means;

difference calculation means for calculating a plurality of differences between a plurality of said control variable corresponding to the current manipulation value and the actual value of the control variable detected by said detection means along an axis of said control variable in the coordinate system;

conformity determination means for determining the conformity under a basis of that a control rule having a smaller difference has a larger value; and means for preparing the synthetic control rule in such manner that a ratio of difference between the control rule corresponding to the current manipulation value and the actual value of the control variable in view of the axis of the control variable in the coordinate system is same with a ratio of difference between a certain value of said control variable in view of the axis of the control variable in the coordinate system at a certain manipulation value and the control rule.

\* \* \* \* \*